United States Patent [19]

Hirata

[11] Patent Number: 5,257,195
[45] Date of Patent: Oct. 26, 1993

[54] ON-BOARD VEHICLE POSITION DETECTOR

[75] Inventor: Seiichiro Hirata, Sanda, Japan

[73] Assignee: Mitsubishi Denki K.K., Tokyo, Japan

[21] Appl. No.: 757,421

[22] Filed: Sep. 10, 1991

[30] Foreign Application Priority Data

Sep. 12, 1990 [JP] Japan .................. 2-239929
Sep. 12, 1990 [JP] Japan .................. 2-239930

[51] Int. Cl.$^5$ .............................................. G06F 15/50
[52] U.S. Cl. ...................... 364/449; 364/450; 342/357
[58] Field of Search ............. 364/443, 449, 450, 453, 364/454; 342/357, 358, 451; 73/178 R

[56] References Cited

U.S. PATENT DOCUMENTS

| 4,459,667 | 7/1984 | Takeuchi | 364/450 |
| 4,688,176 | 8/1987 | Hirata | 364/449 |
| 4,731,613 | 3/1988 | Endo et al. | 364/450 |
| 4,899,285 | 2/1990 | Nakayama et al. | 342/357 |
| 4,903,212 | 2/1990 | Yokouchi et al. | 364/449 |
| 4,949,268 | 8/1990 | Nishikawa et al. | 364/450 |
| 5,087,919 | 2/1992 | Odagawa et al. | 364/450 |

FOREIGN PATENT DOCUMENTS

| 379198 | 7/1990 | European Pat. Off. |
| 2013906 | 10/1970 | Fed. Rep. of Germany |
| 3227547 | 2/1984 | Fed. Rep. of Germany |
| 3310111 | 9/1984 | Fed. Rep. of Germany |

Primary Examiner—Gary Chin
Attorney, Agent, or Firm—Sughrue, Mion, Zinn, Macpeak & Seas

[57] ABSTRACT

An on-board vehicle position detector includes a dead reckoning position detector 4 and a GPS receiver 6, the outputs of which are stored in the dead reckoner data memory unit 8 and the GPS data memory unit 7, respectively, at a predetermined sampling period. Usually, the position of the vehicle is determined on the basis of the data obtained via the GPS receiver 6. When, however, the vehicle travel distance between two successive sampling times as determined via the GPS receiver 6 becomes abnormally large, the position data of the dead reckoning position detector 4 is selected.

5 Claims, 5 Drawing Sheets

ON-BOARD VEHICLE POSITION DETECTOR

BACKGROUND OF THE INVENTION

This invention relates to on-board vehicle position detectors, and more particularly to those utilized in automobile navigation systems.

The Global Positioning System (GPS) is attracting attention as a means for detecting and determining the position of moving objects, such as ships, airplanes, and automobiles. For example, an article by T. Itoh et al., "Navigation System Using GPS for Vehicles", SAE (Society of Automotive Engineers, Inc.) Technical Paper Series 861360, 1986, describes an automotive application of the GPS navigation system.

The position detector utilizing Global Positioning System (GPS) determines the current position of a vehicle (moving object) on the basis of radio waves received from a plurality of satellites. Generally, the Global Positioning System (GPS) position detector (receiver) receives clock signals from three or more GPS satellites. The clock data from a plurality of satellites are compared with the clock of the vehicle, and the distances from the vehicle to the respective satellites are determined on the basis of the differences of the clock on the vehicle and those of the satellites. The current position of the vehicle is determined from the distances to the respective GPS satellites.

The GPS position detectors are capable of determining the position the vehicle accurately, to within about 30 meters. However, for the determination of the position of the vehicle, the GPS position detectors are in need of clock signals from GPS satellites. If signals from GPS satellites are not available, the GPS position detectors cease functioning. On the other hand, the self-contained or independent type position detectors (the dead reckoning type position detectors) are capable of determining the current position of vehicles solely on the basis of the data obtained by themselves. However, they are not as accurate as the GPS position detectors.

Thus, a GPS and a dead reckoning position detector are usually combined and used together in a single vehicular on-board position detector unit. In such case, when signals from three or more GPS satellites are available, the position is determined on the basis of the information obtained via the GPS position detector system. When, on the other hand, such condition is not satisfied, the position of the vehicle is determined on the basis of data obtained via the dead reckoning position detector.

This combined type position detector, however, still has the disadvantage that position data obtained via the GPS position detector system may sometimes contain a large error due to the so-called multi-path effect. Namely, when the vehicle is running in a mountain or city area, the GPS radio waves from the satellites may reach the vehicle after being reflected by mountains or buildings. Then, the paths of the GPS radio waves from the satellites to the vehicle are longer than the proper direct paths from the GPS satellites to the vehicle. Under such circumstances, the position of the vehicle obtained on the basis of the GPS measurement data contains a large error, and an abnormal position may thus be displayed by the position detector.

SUMMARY OF THE INVENTION

It is therefore an object of this invention to provide a combined type on-board vehicle position detector including the GPS receiver and the self-contained type detector systems, which is capable of determining the current position of the vehicle accurately even when, in particular, the vehicle is running in a region such as a mountain or city area where the multi-path effect is conspicuous.

The above project is accomplished in accordance with the principle of this invention by a vehicle position detector which comprises: a GPS receiver for receiving GPS signals from GPS satellites and for determining at a predetermined period a current position of the vehicle on the basis of GPS signals received from the GPS satellites; a dead reckoning position detector for determining a current position of the vehicle at a predetermined period cycle on the basis of data obtained by sensors mounted on the vehicle; a first memory means for storing position data obtained via the GPS receiver means; a second memory means for storing position data obtained via the dead reckoning position detector means; a comparator means for comparing a position of the vehicle as determined by the GPS receiver means at a current determination cycle with a position of the vehicle as determined by the GPS receiver means at an immediately preceding determination cycle, said comparator means calculating a distance between the position of the vehicle determined at the current determination cycle and the position of the vehicle determined at the immediately preceding determination cycle; and a switcher means for switching a current output of the vehicle position detector in accordance with a result of comparison via comparator means, wherein said switcher means selects as the current output of the vehicle position detector a position obtained via dead reckoning position detector means when said distance exceeds a predetermined reference value, said comparator means otherwise selecting a position obtained via the GPS receiver means.

Thus, usually, the position of the vehicle is determined on the basis of the data obtained via the GPS receiver. When, however, the vehicle travel distance between two successive sampling times as determined via the GPS receiver becomes abnormally large, the position data of the dead reckoning position detector is selected.

Alternatively, the GPS receiver may determine at a predetermined period a current height and a velocity, as well as a planar position of the vehicle on the basis of GPS signals received from the GPS satellites. Then, the comparator means determines whether or not the height and velocity determined via the GPS receiver means fall within respective predetermined ranges.

Switcher means then switches a current output of the vehicle position detector in accordance with the result of the determination by the comparator means, wherein the switcher means selects as the current output of the vehicle position detector a position obtained via the GPS receiver when both the height and velocity determined via the GPS receiver means fall within the respective predetermined ranges, the switcher means otherwise selecting a position obtained via the dead reckoning position detector.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
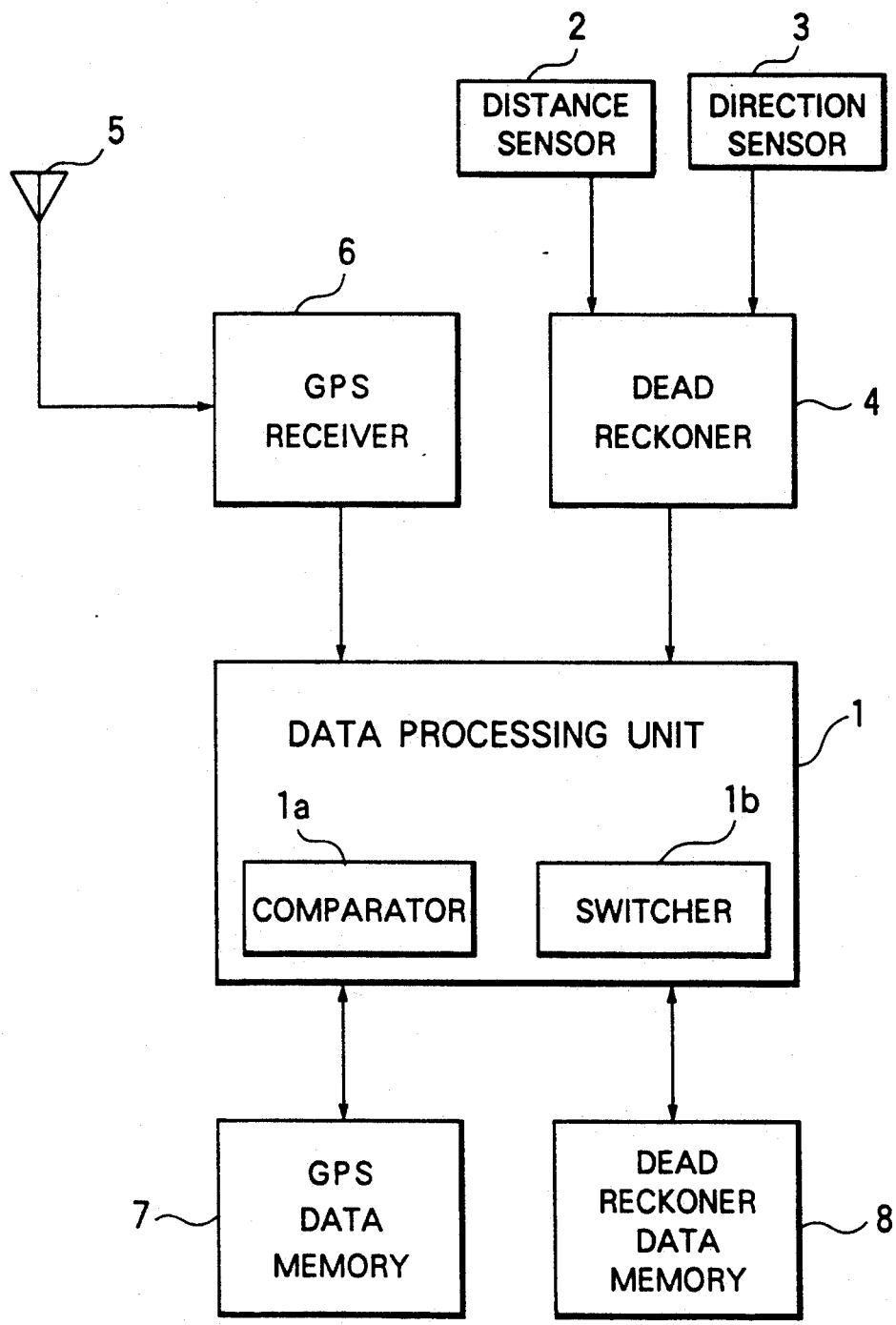
FIG. 1 is a block diagram showing the organization of a first embodiment of this invention.

FIG. 1 is a block diagram showing the organization of a first embodiment of this invention. The vehicle position detector of FIG. 1 mounted on a vehicle (automobile) includes a data processing unit 1 which receives data from a dead reckoning position detector (i.e., independent or self-contained type position detector) 4 and a Global Positioning System (GPS) position detector 6. The dead reckoning position detector 4 is supplied data from a distance sensor 2 and a direction sensor 3 which determine the traveling distance and direction, respectively, of the moving vehicle by means of a velocity sensor and a geomagnetic sensor, respectively. The dead reckoning position detector 4 determines at a predetermined period the current position of the vehicle on the basis of the data supplied from the distance sensor 2 and the direction sensor 3. The GPS receiver 6 is fed from the output of an antenna 5 which receives radio waves from GPS satellites. The GPS receiver 6 determines at a predetermined period the current position of the vehicle on the basis of the clock signals obtained from three or more GPS satellites.

The data processing unit 1, which is supplied data from the dead reckoning position detector 4 and the GPS receiver 6, includes a comparator means 1a and a switcher means 1b. The successive positions of the vehicle determined by the GPS receiver 6 and the dead reckoning position detector 4, respectively, are stored via the data processing unit 1 in a GPS data memory unit 7 and a dead reckoner data memory unit 8, respectively, which are connected to the data processing unit 1.

The operation of the vehicle position detector of FIG. 1 is as follows.

Figure 2:
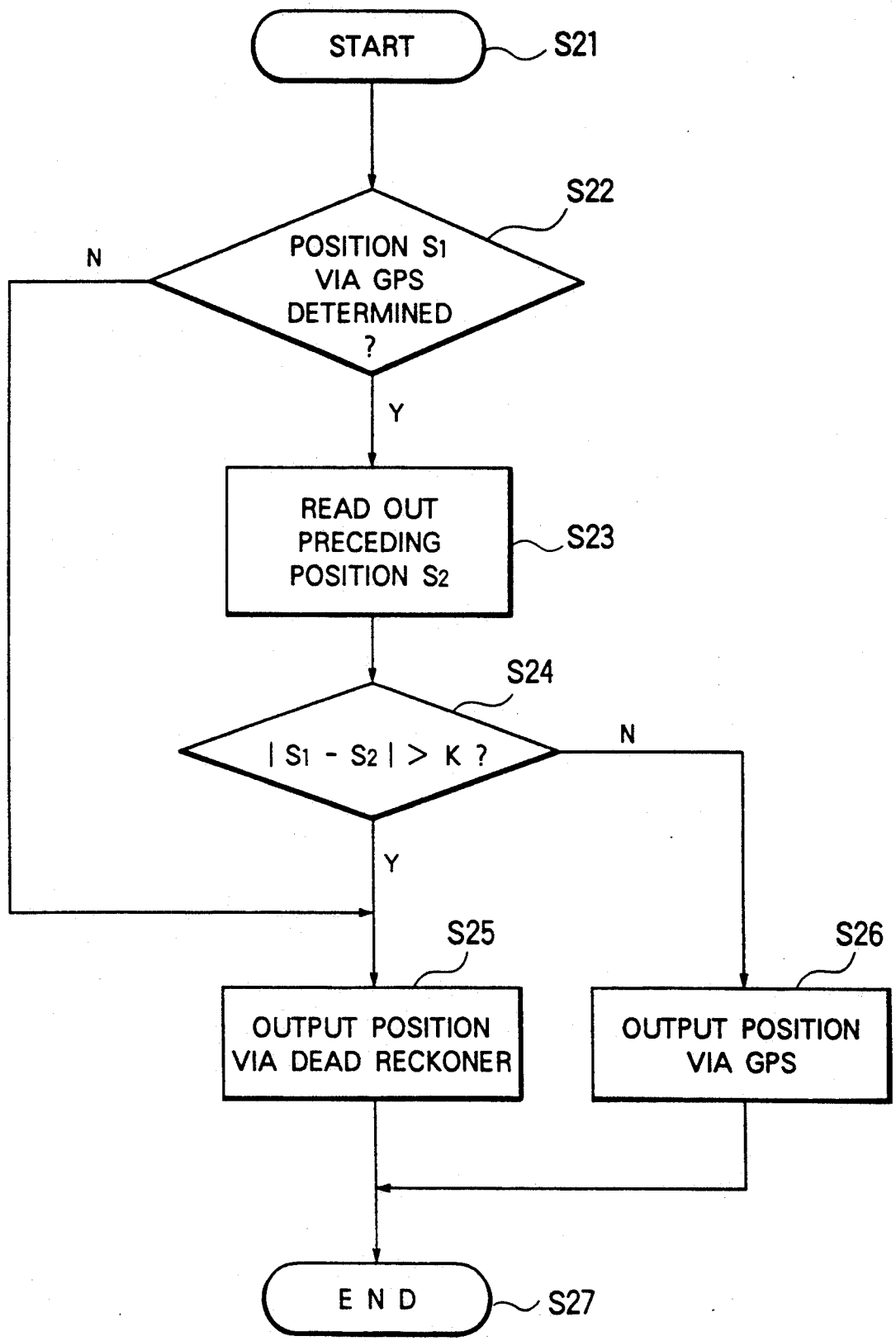
FIG. 2 is a flowchart showing the position detection procedure of the vehicle position detector of FIG. 1.

FIG. 2 is a flowchart showing the position detection procedure of the vehicle position detector of FIG. 1. At the start step S21, the driver of the vehicle starts the vehicle position detector by hitting, for example, a start key on the key input board of the vehicle position detector. Thus, the GPS receiver 6 and the dead reckoning position detector 4 begin to determine the present or current position of the vehicle at a predetermined period, and the data processing unit 1 stores the respective position data successively in the GPS data memory unit 7 and the dead reckoner data memory unit 8, respectively. When, however, clock signals from three or more GPS satellites are not available, the GPS receiver 6 ceases to determine the position of the vehicle.

At step S22, judgement is made whether or not a position determination of the vehicle position S1 by means of the information from satellites has been made for the current position determination cycle. If the result of the judgment at step S22 is negative, the execution proceeds to step S25, where the position information obtained from dead reckoning position detector 4 is output.

On the other hand, when the result of judgment at step S22 is affirmative, the execution proceeds to next step S23, where the position S2 of the vehicle determined at the immediately preceding position determination cycle is read out from the GPS data memory unit 7. Further, at step S24, judgment is made by the comparator means 1a of the data processing unit 1 whether or not the distance between S1 and S2 (the distance traveled by the vehicle) is greater than a predetermined reference value K:

$$|S1-S2| > K$$

If the result of judgment at step S24 is affirmative, the execution proceeds to next step S25, where the current position information obtained from the dead reckoning position detector 4 is output. On the other hand, when the result of judgment at step S24 is negative, the execution proceeds to step S26, where the current position information based on data from the GPS receiver 6 is output. The switcher means 1b of the data processing unit 1 switches the output between the position data as determined via GPS information and the position data as determined via dead reckoning position detector, in accordance with the result of judgment at step S24.

Thus, usually, the position of the vehicle is determined on the basis of the data obtained via the GPS receiver 6. When, however, the vehicle travel distance between two successive sampling times as determined via the GPS receiver 6 becomes abnormally large, the position data of the dead reckoning position detector 4 is selected.

Figure 3:
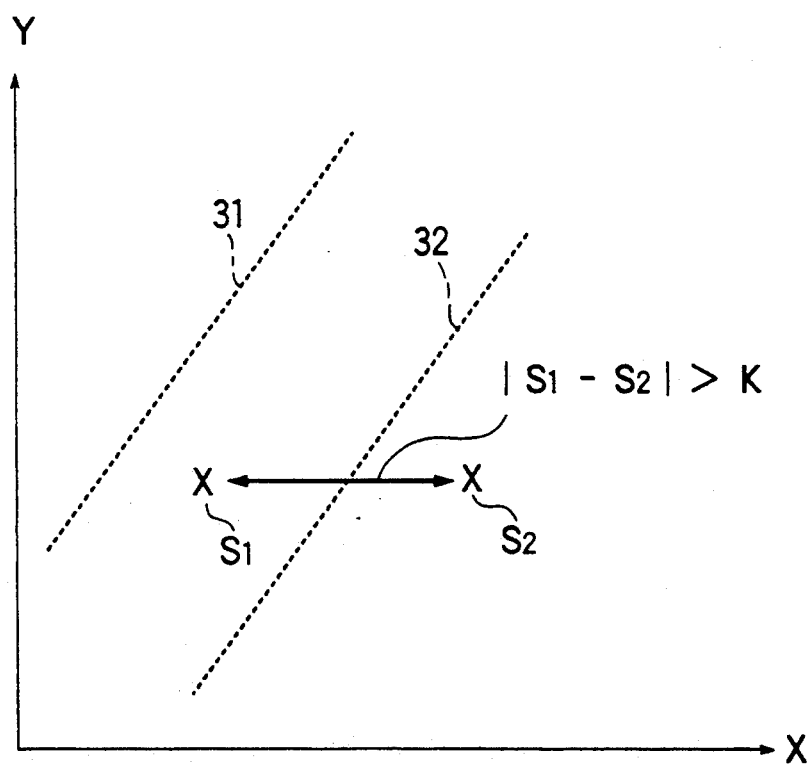
FIG. 3 is a diagram showing the operation characteristics of the vehicle position detector of FIG. 1.

FIG. 3 is a diagram showing the operation characteristics of the vehicle position detector of FIG. 1. The moving vehicle is plotted in the X-Y plane. Two dotted lines 31 and 32 are drawn at 45 degrees on both side of the latest position S1 determined via GPS data. The judgment at step S24 may be effected by determining whether or not the vehicle position S2 determined at the preceding determination cycle is outside of the region between the two lines 31 and 32.

Figure 4:
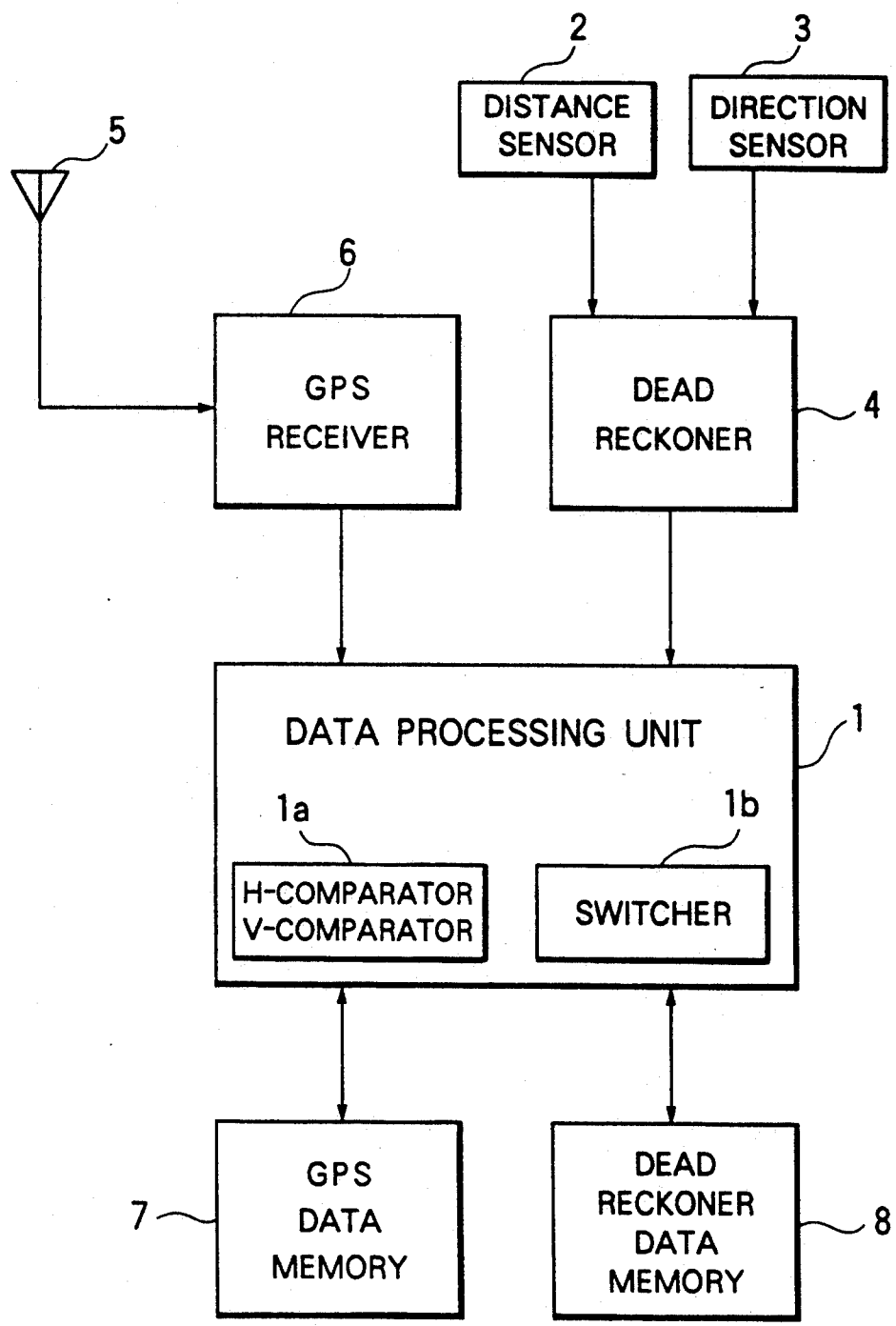
FIG. 4 is a block diagram showing the organization of a second embodiment of this invention.

FIG. 4 is a block diagram showing the organization of a second embodiment of this invention. The GPS receiver 6 of the position detector of FIG. 4 outputs at a predetermined period the height (altitude) and the velocity, as well as the planar position, of the vehicle. Alternatively, the data processing unit 1 may calculate the velocity of the vehicle from the successive positions supplied from the GPS receiver 6. The data processing unit 1 stores the successive GPS data in the GPS data memory unit 7. Further, the comparator means 1a of the data processing unit 1 includes a height comparator unit (H-comparator) and velocity comparator unit (V-comparator). Otherwise, the organization of the position detector is similar to that of FIG. 1.

Figure 5:
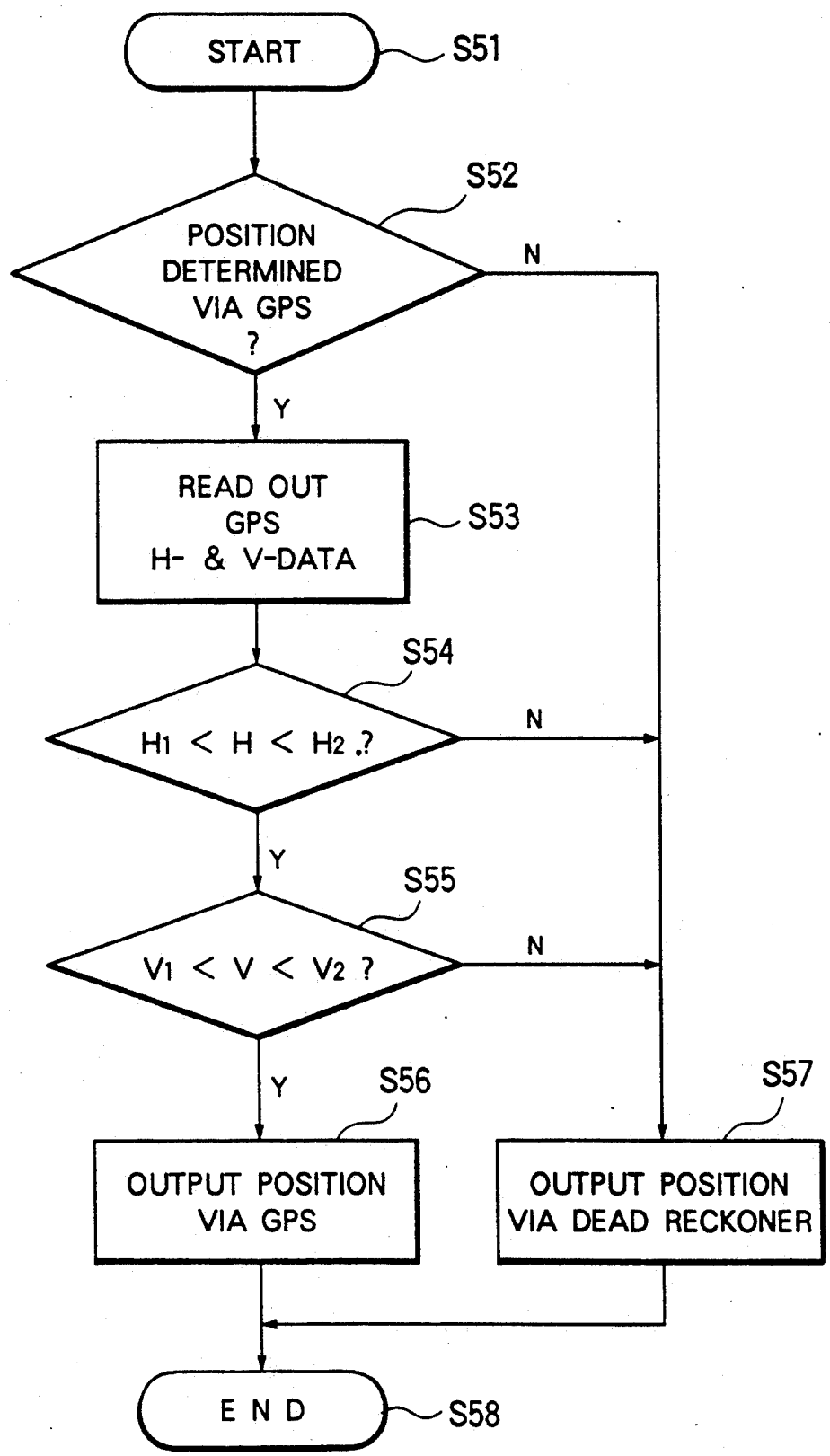
FIG. 5 is a flowchart showing the position detection procedure of the vehicle position detector of FIG. 4.

The operation of the vehicle position detector of FIG. 4 is described by referring to FIG. 5.

FIG. 5 is a flowchart showing the position detection procedure of the vehicle position detector of FIG. 4. At the start step S51, the driver of the vehicle starts the vehicle position detector by hitting, for example, a start key on the key input board of the vehicle position detector. Thus, the dead reckoning position detector 4 begins to determine the position of the vehicle at a predetermined period. Further, the GPS receiver 6 begins to determine the height and the velocity, as well as the planar position, of the vehicle at a predetermined period. When, however, clock signals from three or more GPS satellites are not available, the GPS receiver 6 ceases to determine these values. The data processing unit 1 stores the respective data obtained by the GPS receiver 6 and the dead reckoning position detector 4, successively, in the GPS data memory unit 7 and the dead reckoner data memory unit 8, respectively.

At step S52, judgment is made whether or not the position determination of the vehicle by means of the information from satellites has been made for the current position determination cycle. Namely, judgment is made whether or not the GPS receiver 6 has output data for the current period.

If the result of the judgment at step S52 is negative, the execution proceeds to step S57, where the position information obtained from dead reckoning position detector 4 is output.

On the other hand, when the result of judgment at step S52 is affirmative, the execution proceeds to next step S53, where the height data H and the velocity data V of the vehicle determined at the preceding cycle is read out from the GPS data memory unit 7. Further, at step S54, judgment is made whether or not the height H falls between a predetermined minimum reference value H1 and a predetermined maximum reference value H2:

$$H1 < H < H2$$

This judgement at step S54 is effected by the H-comparator of the comparator means 1a of the data processing unit 1.

If the result of judgement at step S54 is negative, the execution proceeds to step S57, where the position information obtained from dead reckoning position detector 4 is output.

If the result of judgement at step S54 is affirmative, the execution proceeds to step S55, where a further judgment is made whether or not the velocity V falls between a predetermined minimum reference value V1 and a predetermined maximum reference value V2:

$$V1 < V < V2$$

This judgment at step S55 is effected by the V-comparator within the comparator means 1a of the data processing unit 1.

If the result of judgment at step S55 is negative, the execution proceeds to step S57, where the position information obtained from dead reckoning position detector 4 is output. If the result of judgment at step S55 is affirmative, the execution proceeds to next step S56, where the current position information based on data from the GPS receiver 6 is output.

The switcher means 1b of the data processing unit 1 switches the output between the position data as determined via GPS information and the position data as determined via dead reckoning position detector, in accordance with the result of judgments at steps S54 and S55.

What is claimed is:

1. A vehicle position detector mounted on a vehicle, comprising:
    GPS receiver means for receiving GPS signals from GPS satellites and for determining at a predetermined cycle a current position of the vehicle on the basis of said GPS signals received from the GPS satellites;
    dead reckoning position detector means for determining a current position of the vehicle at a predetermined cycle on the basis of data obtained by sensors mounted on the vehicle;
    first memory means for storing position data obtained by the GPS receiver means;
    second memory means for storing position data obtained by the dead reckoning position detector means;
    comparator means for comparing, exclusively, a position of the vehicle as determined by the GPS receiver means at a current determination cycle with a position of the vehicle as determined by the GPS receiver means at an immediately preceding determination cycle, said comparator means calculating a distance between the position of the vehicle determined at the current determination cycle and the position of the vehicle determined at the immediately preceding determination cycle; and
    switcher means for switching a present output of the vehicle position detector esclusively in accordance with a result of said comparison by the comparator means, wherein said switcher means selects as the present output of the vehicle position detector a position obtained by the dead reckoning position detector means when said distance exceeds a predetermined reference value, said comparator means otherwise selecting a position obtained by the GPS receiver means.

2. A vehicle position detector as claimed in claim 1, wherein said dead reckoning position detector means determines the present position of the vehicle on the basis of outputs of a distance sensor and a direction sensor mounted on the vehicle.

3. An on-board vehicle position detector mounted on a vehicle, comprising:
    GPS receiver means for receiving GPS signals from GPS satellites and for determining at a predetermined cycle a present height, velocity and a planar position of the vehicle on the basis of said GPS signals received from the GPS satellites;
    dead reckoning position detector means for determining a present position of the vehicle at a predetermined cycle on the basis of data obtained by sensors mounted on the vehicle;
    GPS data memory unit means for storing data obtained by the GPS receiver means;
    dead reckoner data memory unit means for storing position data obtained by the dead reckoning position detector means;
    comparator means for determining, exclusively, whether or not the height and velocity determined by the GPS receiver means fall within respective predetermined ranges; and
    switcher means for switching a present output of the vehicle position detector exclusively in accordance with a result of said determination by the comparator means, wherein said switcher means selects as the present output of the vehicle position detector a position obtained by the GPS receiver means when both the height and velocity determined by the GPS receiver means fall within the respective predetermined ranges, said switcher means otherwise selecting a position obtained by the dead reckoning position detector means.

4. A vehicle position detector as claimed in claim 3, wherein said comparator means determines whether or not the height and velocity determined by the GPS receiver at an immediately preceding determination cycle fall within said respective predetermined ranges.

5. A vehicle position detector as claimed in claim 3, wherein said dead reckoning position detector means determines the present position of the vehicle on the basis of outputs of a distance sensor and a direction sensor mounted on the vehicle.

* * * * *